Figure 1:
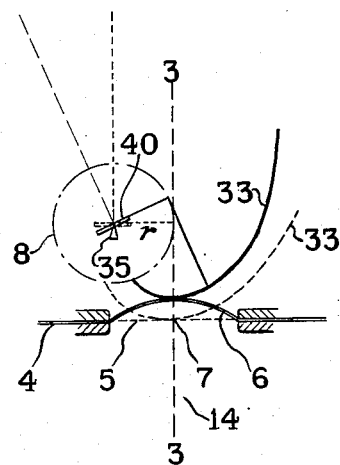

July 6, 1954     W. T. SMITH ET AL     2,682,769
RUPTURE TESTER FOR SHEET MATERIALS
Filed June 6, 1950     2 Sheets-Sheet 1

INVENTORS
William T. Smith
Maynard R. Euverard
Francis P. Callahan, Jr

BY *Eric E. Franke*

ATTORNEY

July 6, 1954   W. T. SMITH ET AL   2,682,769
RUPTURE TESTER FOR SHEET MATERIALS
Filed June 6, 1950   2 Sheets-Sheet 2

INVENTORS
William T. Smith
Maynard R. Euverard
Francis P. Callahan, Jr

BY   *Eric E. Jreenke*

ATTORNEY

Patented July 6, 1954

2,682,769

UNITED STATES PATENT OFFICE 2,682,769

RUPTURE TESTER FOR SHEET MATERIALS

William T. Smith, Rahway, and Maynard R. Euverard, Short Hills, N. J., and Francis P. Callahan, Jr., New York, N. Y., assignors to Interchemical Corporation, New York, N. Y., a corporation of Ohio Application June 6, 1950, Serial No. 166,514

5 Claims. (Cl. 73—102)

This invention relates to improvements in testing devices and more particularly to improvements on the "Mullen" tester which is well known to the art of paper testing. The original "Mullen" tester comprises a pressure head including a diaphragm against which the sheet of paper to be tested is clamped and, while in such clamped position, the machine is operated to deliver to one surface of the paper progressive fluid pressures which can be read on a dial associated with the machine. By observing the dial, as the pressure is raised, the strength of the paper and its bursting point may be determined.

In U. S. Patent No. 2,332,818, for "Test Apparatus," issued on October 26, 1943, one of us has disclosed an improved modification of the foregoing device. A hingedly mounted dial micrometer the operating stem of which is in engagement with the specimen to be tested is actuated as the specimen is deflected and shows, in conjunction with the usual dial of the standard tester, the deflection of the sample for any particular amount of pressure applied thereto. This modification was found specifically useful for determining the bursting strength of doped airplane fabrics and, subsequently, for so-called "cold check tests" for wood finishes, i. e. the determination of the ability of a surface coating to cope with dimensional changes in the substrate. It has been established that film flexibility of wood finishes, as evidenced by cold check failure, can be correlated with elongation data and that finish failures on wood surfaces can be avoided by maintaining a standard of distension potential at low temperature, as determined by means of the device of the above-mentioned patent.

However, because the device requires several manual adjustments after the specimen has been inserted and the hingedly mounted micrometer swung into position, which comprise connecting two parts of the micrometer stem, lowering the micrometer until the end of the stem rests upon the specimen and adjusting the micrometer needle to zero position, some dexterity is required in order to obtain consistent results and tests made by different operators are of low comparison value. In addition, regardless how careful the adjustments are made, errors may be caused by play inherent in the construction or from wear of the various elements comprising the mechanical linkage between the specimen and the device indicating the degree of distension. When operating the device at low temperatures, further difficulties arise from bodying up of the lubricants applied to the mechanical linkage and to the dial gauge.

According to the present invention, an instrument of this general type has been adapted for optically measuring the distension of materials under various pressures and for indicating the degree of distension upon an appropriate scale. The invention eliminates the difficulties encountered with the prior mechanical means of measuring, increases the speed of testing several times and permits the comparison of test results made by different operators and with different instruments. Moreover, it reduces to a minimum any pressure exerted by the measuring means upon the surface of the specimen.

The principal object of the invention is, therefore, the provision of means, in connection with an appropriate device, for optically indicating the amount of elongation of a specimen while it is being distended by the device.

Figure 2:
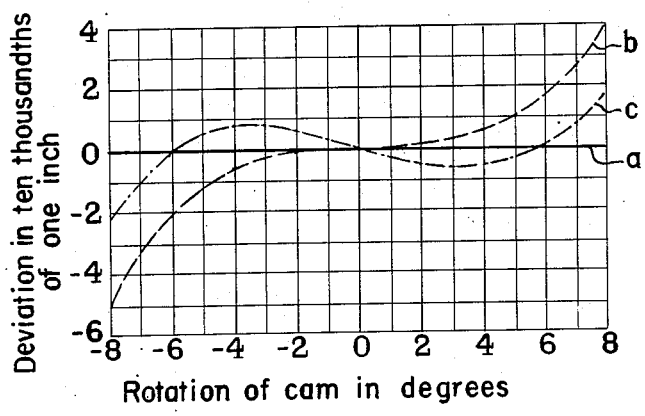
Figure 3:
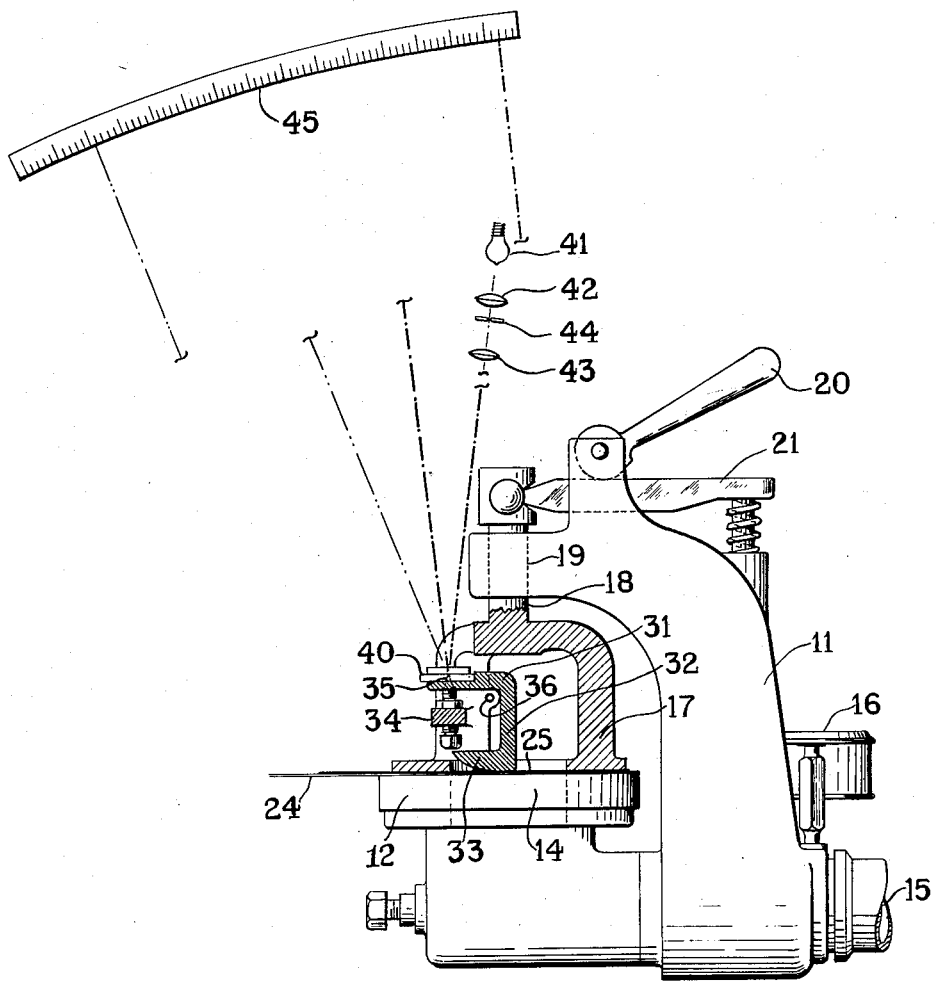
Figure 4:
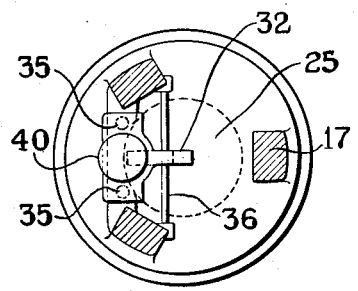

In the drawings accompanying this specification and forming part thereof,

Figs. 1 and 2 are diagrammatic presentations of the principles of the invention, Fig. 3 is an elevation of a complete testing apparatus, and Fig. 4 is a horizontal section of part of the testing apparatus.

In its preferred form the invention consists, in association with a "Mullen" tester, of a pivotally supported cam lever which has a mirror attached at the point of support and a cam adapted to bear against the specimen, a source of light throwing onto the mirror the image of a hairline crossing a field of light, and a scale positioned to receive the image reflected from the mirror. With this arrangement, for every value of distension there is an associated value of mirror angle which is translated into linear data by observing the position of the image reflected onto the scale.

Referring more specifically to Fig. 1, the numeral 4 indicates a distensible specimen, held over an aperture 14. If, say, the cam 33 of a cam lever having a pivotal support 35 and carrying a mirror 40 fastened at the point of pivotal support is rested against the center point 7 of the undistended specimen, upon applying hydraulic pressure through the aperture 14 against the specimen, the test surface of the latter changes from a plane surface (shown by the broken line 5) to a spheroidical surface 6. The cam lever will be raised thereby and turned about its pivotal support. However, in order to translate the resulting angular change in the position of the mirror into meaningful results, the cam must always bear against the apex of the rising spheroidical segment. This requirement is completely met by a cam lever having a cam in the shape of the cam 33 resting against the center of the test surface, which cam has the curvature of an involute to the circle 8. This curvature is defined as follows:

$$x = r(\cos Z + Z \sin Z)$$
$$y = r(\sin Z - Z \cos Z)$$

wherein $x$ and $y$ are ordinates originating at the center 35 of the circle 8, $r$ is the radius of the said circle which is equal to the shortest distance between the center of the said circle and the line 3—3 along which the center point 7 of the specimen rises when the latter is distended; and Z is a parameter in terms of which $x$ and $y$ are expressed.

A cam lever with a cam having the above defined involute curvature permits accurate distension measurements on specimens having any suitable size test area and over any range of distension. Work with the "Mullen" tester, on the other hand, is confined to more limited ranges. Ordinarily, the diameter of the test surface is about one and $\frac{3}{16}$ inch, to provide a test area of one square inch, and the rise of the apex of the distended material ordinarily does not exceed one-fourth of one inch. Therefore, only a very short segment of the involute is needed for the cam. In addition, since with the rise of the test surface the vertical arm of the cam lever will always swing to the right if the pivotal support of the cam lever is on the left, the cam does not need to extend to the right of the vertical arm and a cam having a curvature of, say, one-half inch in length will be entirely satisfactory.

Because of the shortness of the cam required in this specific instant, the involute curvature thereof can be replaced by a segment of any other curve which closely follows the shape of the involute over the limited range.

However, depending upon the desired accuracy, selecting any other curve than the described involute requires the most careful consideration. For example, if the involve is replaced by the segment of a circle the center of which is one inch distant from the pivot point and the radius of which is one inch; and assuming that the circle segment coincides with the involute after the apex of the test surface has risen for ⅛ inch, errors of 0.0005 inch and 0.0004 inch, respectively, will be introduced with the said circular cam resting against the undistended surface at one time and against an apex ¼ inch high at another time.

The foregoing is graphically illustrated in Fig. 2, wherein "a" represents the involute and "b" the above described circular cam curvature, showing the deviation of the latter from the involute in ten thousandths of one inch for various degrees of rotation of the cam. Thus, where an accuracy of, say, ±0.0001 inch is required, rotation of the cam for more than 5° in either direction causes a deviation beyond the set limit. "c" represents the curvature of a circle fitted more closely to the curvature of the involute over such short distance. This curve results from shifting the center of the circle 0.002 inch to the right, in other words, from locating the center of the circle 1.002 inch distant from the pivot point 35 in Fig. 1. The cam can now be rotated for 7° in either direction before an error exceeding ±0.0001 inch is introduced.

Therefore, replacement of the involute cam by a circular cam is in order only where the distension tests consist in comparing specimens with a fixed standard of distension and where only minute variations from the standard are to be expected.

Fig. 3 depicts the invention in conjunction with a "Mullen" tester. 11 designates a standard Mullen tester, embodying among other structural elements a pressure head 12 having the usual concentric circular opening 14 of, say, 1 square inch. A diaphragm 24 may be either fixed in position over the circular opening, or may be inserted with every measurement as the specimen which is to be tested or as the carrier of a specimen 25. Hydraulic pressure, supplied at 15, is exerted upon the diaphragm from within the pressure head and the pressure increment is observed on the dial gauge 16 forming part of the standard instrument. The specimen is secured to the pressure head by means of, preferably, a tripodic clamping device 17, the stem 18 of which extends upwardly through a guiding head 19 and is adapted to be acted upon by means of the lever bar 20 having a cam bearing against the spring supported arm 21.

In associating the present invention with a device of this type, a cam lever is inserted into the opening provided by the clamping device, the said cam lever consisting of a horizontal arm 31, a vertical arm 32, anad a cam 33, hereinbefore described in detail. The horizontal arm shown as extending to the left and being enlarged to a platform is pivotally supported by two set screws 35 passing through the cross bar 34 connected between two of the columns of the clamping device. These set screws are crowned with pivots fitting into conical bearings of suitably hard material inserted into the platform. This arrangement keeps the cam lever in one plane, provides the necessary sensitivity and permits adjustments of the fulcrum position. The effective lever length of the arm 31 is such that the heel of cam 33, i. e., a point of the cam curvature which is below or near the vertical arm 32, rests against exactly the center of the undistended test surface. In addition, the said arm 31 carries a mirror 40 which is sunk between the two pivots so as to provide a reflecting surface exactly in alignment with the fulcrum and is adapted to receive a beam of light at a deviation of say, 10° to 15° to the vertical. This beam originates from the light source 41 and passes the lenses 42 and 43 with a hairline mounting 44 therebetween. The image of the hairline crossing a field of light which is reflected by the mirror 40 is thrown against a scale 45, suitably positioned in such a manner that, when the cam rests against an undistended specimen the image of the hairline will coincide with the zero mark on the scale and will move along the scale with a positive pressure increment and distension of the specimen. If, for example, a properly curved scale is positioned at a distance of 37 inches from the center of the mirror 40, a 0.0001 inch rise at the center of the specimen is represented by one-eigth of one inch on the scale. In order to indicate $a$, say, maximum distension of one-eighth of one inch, a scale 37 inches distant from the mirror must comprise an arc of 13° 51' or have a length of about 16 inches. Employing the necessary correction factors, the curved scale can easily be replaced by a straight scale.

In order to accomplish the insertion and removal of specimens without disturbing the delicate cam lever, the lifting bar 36 is provided, which is mounted hirizontally between two legs of the clamping device 17 and positioned close to the junction of the two arms of the cam lever. When the clamping device is raised by means of the lever bar 20, the lifting bar engages the cam lever and raises it simultaneously.

Having described our invention, what we claim as new and desire to secure by Letters Patent is:

1. In an apparatus for distension testing of sheet material, wherein fluid pressure is applied to a test surface of the material while it is clamped between a pressure head and a co-axial clamping device, the combination with said clamping device of a lever frame laterally disposed substantially internally of said clamping device, the said lever frame having a cam surface at the base to contact the specimen at the line of rise of the center of the test surface and being pivoted at a point which is displaced to one side from said line of rise and coincides with the center of a circle lying in the plane of rotation of said lever frame which is perpendicular to the axis of rotation of said lever frame, the said circle having a radius which is equal to the shortest distance between the center of the said circle and the said line of rise, the said cam surface having a curvature which approximates over an operative range the involute to the said circle; and means responsive to movement of the said lever frame for indicating the extent of distension of the test surface from the degree of rotation of the lever frame.

2. In an apparatus according to claim 1, the cam surface of the lever frame having the said involute curvature.

3. In an apparatus according to claim 1, the cam surface of the lever frame having the curvature of a circle, said circle lying in the plane of rotation of the said lever frame which is perpendicular to the axis of rotation of the lever frame and includes the line of rise of the center of the test surface, having its center at the point of intersection between the line of shortest distance drawn from the center of rotation of the said lever frame to the said line of rise, and having a radius equal to the said shortest distance between the said center of rotation of the lever frame and the said line of rise.

4. In an apparatus according to claim 3, cam surface of the lever frame having the curvature of a circle, wherein the center of the said circle is shifted to a point determined by extending the said line of shortest distance for 1/2000 of its length past the said point of intersection.

5. In an apparatus according to claim 1, wherein the means responsive to movement of the said lever frame for indicating the extent of distension of the said test surface from the degree of rotation of the lever frame comprise a mirror attached to the lever frame in alignment with the axis of rotation of the said lever frame, a source of light throwing an angular beam at the said mirror, a hairline mounting intermediary the said source of light and the said mirror, and a linear scale positioned to register deviations of the beam reflected by the said mirror.

References Cited in the file of this patent

UNITED STATES PATENTS

| Number | Name | Date |
| --- | --- | --- |
| 1,562,936 | Ainsworth | Nov. 24, 1925 |
| 1,758,688 | Cowley | May 13, 1930 |
| 2,131,738 | Hoyt | Oct. 4, 1938 |
| 2,132,865 | Thyssen-Bornemisza | Oct. 11, 1938 |
| 2,446,562 | Trbojevich | Aug. 10, 1948 |